(12) United States Patent
Watson et al.

(10) Patent No.: US 6,277,185 B1
(45) Date of Patent: Aug. 21, 2001

(54) DYE COMPOUNDS, COMPOSITIONS CONTAINING THEM AND THEIR USE

(75) Inventors: Anthony Alanzo Watson, Cheetham; Kathryn Carr, Preston, both of (GB)

(73) Assignee: Zeneca Limited, London (GB)

( * ) Notice: Subject to any disclaimer, the term of this patent is extended or adjusted under 35 U.S.C. 154(b) by 0 days.

(21) Appl. No.: 09/269,060

(22) PCT Filed: Sep. 5, 1997

(86) PCT No.: PCT/GB97/02378

§ 371 Date: May 26, 1999

§ 102(e) Date: May 26, 1999

(87) PCT Pub. No.: WO98/12264

PCT Pub. Date: Mar. 26, 1998

(30) Foreign Application Priority Data

Sep. 19, 1996 (GB) .................................... 9619573

(51) Int. Cl.[7] ............................ C09D 11/02; C09B 29/09; B32B 3/00
(52) U.S. Cl. .................................... 106/31.48; 106/31.77; 534/797; 534/803; 427/466; 428/195
(58) Field of Search ............................ 106/31.48, 31.77; 534/797, 803; 427/466; 428/195

(56) References Cited

U.S. PATENT DOCUMENTS

| | | | |
|---|---|---|---|
| 4,542,208 | 9/1985 | Odani et al. | 534/797 |
| 4,742,160 | * 5/1988 | Dore et al. | 534/797 |

(List continued on next page.)

FOREIGN PATENT DOCUMENTS

| | | |
|---|---|---|
| 703224 | 1/1968 | (BE) . |
| 403122 | 6/1966 | (CH) . |

(List continued on next page.)

*Primary Examiner*—Helene Klemanski
(74) *Attorney, Agent, or Firm*—Rothwell, Figg, Ernst & Manbeck

(57) ABSTRACT

Azo dyes of Formula (1) have utility as dyes for ink-jet printing where Formula (1) represents:

which comprises any suitable form of the compound: such as salt; stereoisomer, zwitterion, polymorph, complex, isotopic form, combinations thereof in the same species and mixtures thereof; where:

p represents from 1 to 7 inclusive;

the napthyl moiety may be optionally substituted;

$R^1$ comprises at least one of the following substituents, optionally substituted:
H, $C_{1-4}$-alkyl, $NHCOC_{1-4}$ alkyl, $C_{1-4}$ alkoxy, NHCOaryl, $NHSO_2C_{1-4}$ alkyl, $NHSO_2$aryl, $NHCONR^3R^4$ where $R^3$ and $R^4$ each independently comprises H, $C_{1-4}$alkyl or aryl;

$R^2$ comprises H, $C_{1-4}$ alkyl or $C_{1-4}$ alkoxy;

$L^1$ and $L^2$ each independently comprises at least one of the following substituents, optionally substituted:
—$NH_2$, —$NHC_{1-4}$ alkyleneOH, —$SC_{1-4}$alkylene —$SO_3H$, —$NHC_{1-4}$alkyleneN($C_{1-4}$alkyl)$_2$, —$N(C_{1-4}$alkyleneOH)$_2$, —$NHC_{1-4}$alkyleneSO$_3$H, —$NHC_{1-4}$alkylene(CO$_2$H)$_n$ where n is 1, 2 or 3, —$SC_{1-4}$alkylene(CO$_2$H)$_m$ where m is 1, 2 or 3, a moiety of Formula (2):

Formula (2)

where:
X represents $NHC_{1-4}$alkylene or a direct link and Y represents O or NH;

a moiety of Formula (3):

Formula (3)

where:
q represents from 1 to 7 inclusive;
the napthyl moiety may be optionally substituted; and
$R^5$ and $R^6$ each independently comprises at least one of the following substituents, optionally substituted: H, $C_{1-4}$-alkyl, $NHCOC_{1-4}$ alkyl, $C_{1-4}$ alkoxy, NHCOaryl, $NHSO_2C_{1-4}$ alkyl, $NHSO_2$aryl and $NHCONR^7R^8$ where $R^7$ and $R^8$ each independently comprises H, $C_{1-4}$alkyl, aryl; and any other suitable labile or non-labile substituent not mentioned above;

where the optional substituents herein comprise: $C_{1-4}$alkyl (optionally substituted with at least one halo), $C_{1-4}$alkoxy (optionally substituted with at least one halo), carboxy, sulpho, hydroxy, amino, mercapto, cyano, nitro and halo.

14 Claims, No Drawings

U.S. PATENT DOCUMENTS

| | | | |
|---|---|---|---|
| 5,006,128 | | 4/1991 | Pedrazzi ................................. 8/437 |
| 5,374,301 | * | 12/1994 | Gregory et al. ................... 106/31.48 |
| 5,631,352 | | 5/1997 | Lauk ................................... 534/797 |
| 5,684,140 | * | 11/1997 | Beattig et al. ..................... 534/803 |
| 5,721,344 | * | 2/1998 | Baettig .............................. 534/803 |
| 5,728,201 | * | 3/1998 | Saito et al. ....................... 106/31.48 |
| 5,753,016 | * | 5/1998 | Hayashi et al. ................... 106/31.48 |
| 5,824,785 | * | 10/1998 | Baettig et al. ..................... 534/803 |
| 5,844,100 | * | 12/1998 | Baetig ............................. 106/31.48 |

FOREIGN PATENT DOCUMENTS

| | | |
|---|---|---|
| 0017831 | 10/1980 | (EP) . |
| 0775984 | 7/1996 | (EP) . |
| 1441174 | 4/1966 | (FR) . |
| 2386589 | 11/1978 | (FR) . |
| 1525280 | 9/1978 | (GB) . |
| 9624635 | 8/1996 | (WO) . |

* cited by examiner

DYE COMPOUNDS, COMPOSITIONS CONTAINING THEM AND THEIR USE

COMPOUNDS COMPOSITION AND USE

This invention relates to dyes, to inks and to their use in ink jet printing ("IJP"). IJP is a non-impact printing technique in which droplets of ink are ejected through a fine nozzle onto a substrate without bringing the nozzle into contact with the substrate.

There are many demanding performance requirements for dyes and inks used in IJP. For example they desirably provide sharp, non-feathered images having good water-fastness, light-fastness and optical density. The inks are often required to dry quickly when applied to a substrate to prevent smudging, but they should not form a crust over the tip of an ink jet nozzle because this will stop the printer from working. The inks should also be stable to storage over time without decomposing or forming a precipitate which could block the fine nozzle.

According to the present invention there is provided at least one compound of Formula (1):

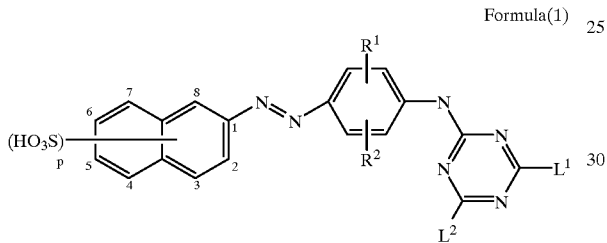

Formula(1)

which comprises any suitable form of the compound: such as salt; stereoisomer, zwitterion, polymorph, complex, isotopic form, combinations thereof in the same species and mixtures thereof; where:

p represents from 1 to 7 inclusive;

the napthyl moiety may be optionally substituted;

$R^1$ comprises at least one of the following substituents, optionally substituted:
H, $C_{1-4}$-alkyl, $NHCOC_{1-4}$ alkyl, $C_{1-4}$ alkoxy, NHCOaryl, $NHSO_2C_{1-4}$ alkyl, $NHSO_2$aryl, $NHCONR^3R^4$ where $R^3$ and $R^4$ each independently comprises H, $C_{1-4}$alkyl or aryl;

$R^2$ comprises H, $C_{1-4}$ alkyl or $C_{1-4}$ alkoxy;

$L^1$ and $L^2$ each independently comprises at least one of the following substituents, optionally substituted:
—$NH_2$, —$NHC_{1-4}$ alkyleneOH, —$SC_{1-4}$alkylene —$SO_3H$, —$NHC_{1-4}$alkyleneN($C_{1-4}$alkyl)$_2$, —N($C_{1-4}$alkyleneOH)$_2$, —$NHC_{1-4}$alkyleneSO$_3$H, —$NHC_{1-4}$alkylene(CO$_2$H)$_n$ where n is 1, 2 or 3, —$SC_{1-4}$alkylene(CO$_2$H)$_m$ where m is 1, 2 or 3, a moiety of Formula (2):

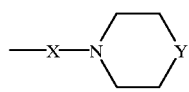

Formula (2)

where:

X represents $NHC_{1-4}$alkylene or a direct link and Y represents O or NH;

a moiety of Formula (3):

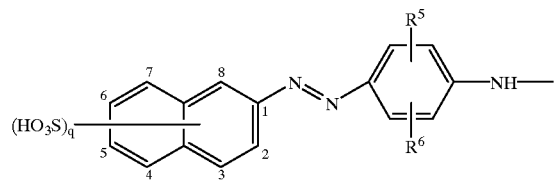

Formula (3)

where:

q represents from 1 to 7 inclusive;

the napthyl moiety may be optionally substituted; and $R^5$ and $R^6$ each independently comprises at least one of the following substituents, optionally substituted: H, $C_{1-4}$-alkyl, $NHCOC_{1-4}$ alkyl, $C_{1-4}$ alkoxy, NHCOaryl, $NHSO_2C_{1-4}$ alkyl, $NHSO_2$aryl and $NHCONR^7R^8$ where $R^7$ and $R^8$ each independently comprises H, $C_{1-4}$alkyl, aryl; and any other suitable labile or non-labile substituent not mentioned above;

where the optional substituents herein comprise:
$C_{1-4}$alkyl (optionally substituted with at least one halo), $C_{1-4}$alkoxy (optionally substituted with at least one halo), carboxy, sulpho, hydroxy, amino, mercapto, cyano, nitro and halo;

with the provisos that when p is 2 and the two —$SO_3H$ groups in the naphthyl moiety are in the 3 and 7 positions, and, if $L^1$ or $L^2$ are Formula (3), q is 2 and the two —$SO_3H$ groups in the naphthyl moiety are in the 3 and 7 positions then:

(a) $L^1$ and $L^2$ cannot both be a group of Formula (3);

(b) when $R^2$ is H, $R^1$ is $CH_3$ in the ortho position with respect to the azo group in Formula (1) and $L^1$ is a group of Formula (3) in which $R^6$ is H and $R^5$ is $CH_3$ in the ortho position with respect to the azo group in Formula (3) then: $L^2$ is other than $NH_2$ or $NHC_2H_4OH$; and (c) when $R^2$ is H, $R^1$ is $OCH_3$ in the ortho position with respect to the azo group in Formula (1) and $L^1$ is a group of Formula (3) in which $R^6$ is H and $R^5$ is $OCH_3$ in the ortho position with respect to the azo group in Formula (3) then: $L^2$ is other than $NHC_2H_4OH$.

When $L^1$ and/or $L^2$ represent a labile atom or group, it is preferably an atom or group which is bound by a chemical bond to the triazine nucleus which is displaceable by a hydroxyl group of cellulose under mildly alkaline aqueous conditions to form a covalent bond between the triazine nucleus and cellulose. Labile atoms and groups that may be represented by $L^1$ and/or $L^2$ independently corprise: halo (preferably F and Cl); sulphonic acid groups; thiocyano groups; optionally substituted quatemary ammonium groups (preferably trialkylammonium groups) and/or optionally substituted pyridinium groups (preferably 3- and 4-carboxy pyridinium groups).

Preferred non-labile groups represented by $L^1$ and/or $L^2$ independently comprise groups of the formulae —$OR^9$, —$SR^{10}$ and/or —$NR^{11}R^{12}$, more preferably —OH, —$NH_2$, —NH($C_{1-4}$alkyl) and/or —NH(hydroxy$C_{2-4}$alkyl). In the preceding formulae $R^9$, $R^{10}$, $R^{11}$ and/or $R^{12}$ are each independently selected from the following optionally substituted substituents: H; alkyl (preferably $C_{1-10}$alkyl, especially $C_{1-4}$alkyl); cycloalkyl; aryl (preferably phenyl); aralkyl

[preferably —(CH$_2$)$_1$phenyl, especially benzyl]; and R$^{11}$ and R$^{12}$ together with the nitrogen atom to which they are attached form an optionally substituted 5- or 6-membered ring, preferably an optionally substituted morpholine, piperidine or piperazine ring, more preferably piperazine in which the free ring N-atom is optionally substituted by a C$_{1-4}$-alkyl or hydroxy-C$_{2-4}$alkyl group. When R$^9$, R$^{10}$, R$^{11}$ and/or R$^{12}$ is substituted, the substituent is preferably selected from the optional substituents listed above, more preferably is selected from: hydroxy, methyl, methoxy, sulpho and carboxy.

Any radical group mentioned above as a substituent refers to a monovalent radical unless otherwise stated. A group which comprises a chain of three or more atoms signifies a group in which the chain wholly or in part may be linear, branched and/or form a ring (including spiro and/or fused rings). The total number of certain atoms is specified for certain substituents for example C$_{1-n}$alkyl, signifies an alkyl group comprising from 1 to n carbon atoms. In any of the formulae drawn herein if one or more ring substituents are not indicated as attached to any particular atom on the ring, for example the —CO$_2$H groups in Formula (1), the substituent may replace any H attached to an atom in the ring and may be located at any available position on the ring. Hydrocarbon substituents or parts of substituents may comprise one or more double and/or triple carbon to carbon bonds and the term 'alkyl' as used herein encompasses alkenyl and alkynyl. The term 'aryl' as used herein comprises any suitable hydrocarbon comprising an aromatic moiety. The term 'halo' as used herein signifies fluoro, chloro, bromo and iodo.

The terms 'acceptable' or 'suitable' (for example with reference to composition ingredients, substituents and/or compounds described herein) will be understood to mean suitable for use in IJP for example by providing desirable properties to the ink or being compatible with any inert carriers and/or diluents suitable for formulating such inks. In relation to the processes described herein suitable compounds are those which will, in addition, undergo the specified reactions. To be particularly acceptable for use in IJP compounds of Formula (1) may be Ames negative.

Preferred dyes of Formula (1) are those in which p is 2, more preferably the two —SO$_3$H groups are attached to the napthyl moiety in Formula (1) at the 3 and 7 positions.

When L$^1$ or L$^2$ comprise a moiety of Formula (2), preferably Y is O.

When L$^1$ or L$^2$ comprise a moiety of Formula (3), preferably q is 2, more preferably the two —SO$_3$H groups are attached to the napthyl moiety in Formula (3) at the 3 and 7 positions.

When R$^1$ and R$^6$ are alkyl they are preferably CH$_3$.

More preferred dyes of Formula (1) are those in which R$^1$ and R$^6$ are both NHCOCH$_3$; R$^3$, R$^4$, R$^7$ and R$^8$ are all H; and n and m is each independently 1 or 2.

Specific compounds of Formula (1) comprise those compounds exemplified herein; any suitable salts thereof, preferably the sodium salts; and any suitable mixtures thereof.

Compounds of Formula (1) may be in the form as shown in the structures herein (e.g. free acid form) but are preferably in the form of salts. Salts of Formula (1) may be formed from one or more organic and/or inorganic base(s) or acid(s) and compounds of Formula (1) which are acidic and/or basic (for example acid and/or base addition salts). Salts of Formula (1) comprise all acceptable salts that may be formed from monovalent and/or multivalent acids and/or bases. Salts of Formula (1) also comprise all enantiomeric salts formed with acceptable chiral acids and/or bases and/or any mixtures of enantiomers of such salts (for example racemic mixtures). Preferred salts are alkali metal salts, especially lithium, sodium and potassium salts, ammonium and substituted ammonium salts. Especially preferred salts are sodium salts. The dyes may be converted into a salt using known techniques. The present invention comprises all acceptable salts of Formula (1) and any suitable mixtures thereof.

Certain compounds of Formula (1) may exist as one or more stereoisomers, for example, enantiomers, diastereoisomers, geometric isomers, tautomers, conformers and/or suitable combinations thereof possible in the same species. It is particularly preferred that dyes of Formula (1) comprise all tautomeric forms including those not Aspecifically illustrated herein. The present invention comprises all acceptable stereoisomers of compounds of Formula (1) and any suitable mixtures thereof.

Certain compounds of Formula (1) may exist as one or more zwitterions, for example, species which comprise two or more centres of ionic charge. The present invention comprises all acceptable zwitterions of Formula (1) and any suitable mixtures thereof.

Certain compounds of Formula (1) may exist as one or more polymorphs, for example, phases, crystalline forms, amorphous forms, solid solutions, interstitial compounds and/or any suitable mixtures thereof. The present invention includes all acceptable polymorphs of Formula (1) and any suitable mixtures thereof.

Certain compounds of Formula (1) may exist in the form of one or more complexes, for example, chelates, solvates, organometallic complexes, and/or complexes with other suitable ligands. Such complexes may be formed between an acceptable substrate in which the compound of Formula (1) and/or the substrate may act as a ligand. The substrate may comprise one or more acceptable solvents to form solvates. The complexes may be non-stoichiometric, for example if the complex is a hydrate it may comprise a hemihydrate, monohydrate and/or dihydrate. The present invention includes all acceptable complexes of Formula (1) and any suitable mixtures thereof.

Certain compounds of Formula (1) may exist as one or more isotopic forms in which one or more atoms in Formula (1) comprise one or more suitable isotopes. The natural ratios of various isotopes may be altered by suitable means, for example certain $^{12}$C atoms in certain compounds of Formula (1) may be substantially replaced by the less common $^{14}$C and/or $^{13}$C isotopes. Optionally certain isotopic forms of Formula (1) may be radio-active. Certain of the isotopic forms of Formula (1) may be used as means for selective imaging in imaging devices (for example devices using X-rays, positron emission tomography and/or nuclear magnetic resonance); and/or as tools to investigate the mode of action of compounds of Formula (1) in IJP. The present invention includes all acceptable, isotopic forms of Formula (1) and any suitable mixtures thereof.

The present invention relates to all compounds of Formula (1) even those which may not be directly acceptable for use in IJP because they exhibit undesirable properties. Such compounds may nevertheless have utility in the field of the present invention for example as intermediates in the preparation and/or purification of acceptable compounds of Formula (1) and/or as research tools and/or diagnostic aids in relation to IJP.

Compounds of Formula (1) may be prepared by any suitable methods analogous to those described in the art for similar azo compounds.

Compounds of Formula (1) may also be prepared by a method described below in steps i) to iii):

i) diazotising an aromatic amine of Formula (4):

Formula (4)

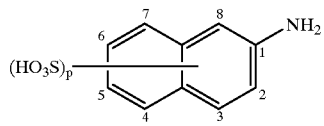

to form the corresponding diazonium salt and coupling with a compound of Formula (5):

Formula (5)

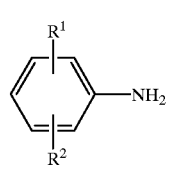

ii) condensing the resulting azo compound preferably in the presence of a base with cyanuric chloride to form a compound of Formula (6):

Formula (6)

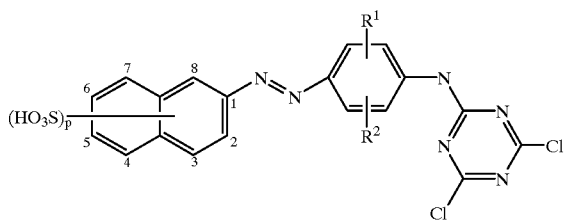

iii) condensing the compound of Formula (6) with compounds of formulae $L^1H$ and $L^2H$ in which p, $R^1$, $R^2$, $L^1$ and $L^2$ are as defined herein, to form a compound of Formula (1).

The reactions leading to the formation of the compounds of Formula (1) may be performed under conditions that have been described in the art. For example diazotisation is preferably performed at a temperature below 6° C., more preferably at a temperature in the range −10° C. to 5° C. Preferably the diazotisation is performed in water, more preferably at a pH below 7. Dilute mineral acids, such as HCl or $H_2SO_4$, are often used to achieve the desired acidic conditions. The azo dyes may be isolated by known methods such as spray drying or precipitation followed by filtration.

An aspect of the present invention comprises an ink comprising at least one compound of Formula (1) as defined herein, without the provisos given above, and a suitable medium.

According to a further aspect of the present invention there is provided an ink comprising:
(a) from 0.01 to 30 parts of a dye of the Formula (1); and
(b) from 70 to 99.99 parts of a liquid medium or a low melting point solid medium; wherein all parts are by weight and the number of parts of (a)+(b)=100.

The number of parts of component (a) is preferably from 0.1 to 20, more preferably from 0.5 to 15, and especially from 1 to 5 parts. The number of parts of component (b) is preferably from 99.9 to 80, more preferably from 99.5 to 85, especially from 99 to 95 parts.

When the medium is a liquid, preferably component (a) is completely dissolved in component (b). Preferably component (a) has a solubility in component (b) at 20° C. of at least 10%. This allows the preparation of concentrates which may be used to prepare more dilute inks and reduces the chance of the dye precipitating if evaporation of the liquid medium occurs during storage.

Preferred liquid media include water, a mixture of water and an organic solvent and an organic solvent free from water.

When the medium comprises a mixture of water and an organic solvent, the weight ratio of water to organic solvent is preferably from 99:1 to 1:99, more preferably from 99:1 to 50:50 and especially from 95:5 to 80:20. Preferably the organic solvent comprising the mixture of water and organic solvent is a water-miscible organic solvent or a mixture of such solvents. The liquid medium may comprise water and preferably two or more, more preferably from 2 to 8, water-soluble organic solvents.

Preferred water-miscible organic solvents comprise:
$C_{1-6}$-alkanols, preferably methanol, ethanol, n-propanol, isopropanol, n-butanol, sec-butanol, tert-butanol, n-pentanol, cyclopentanol and/or cyclohexanol;
linear amides, preferably dimethylformamide and/or dimethylacetamide;
ketones and/or ketone-alcohols, preferably acetone, methyl ether ketone, cyclohexanone and/or diacetone alcohol;
water-miscible ethers, preferably tetrahydrofuran and/or dioxane;
diols, preferably $C_{2-12}$diols (for example pentane-1,5-diol, ethylene glycol, propylene glycol, butylene glycol, pentylene glycol, hexylene glycol and/or thiodiglycol) and/or oligo- and/or poly-alkyleneglycols (for example diethylene glycol, triethylene glycol, polyethylene glycol and/or polypropylene glycol);
triols, preferably glycerol and/or 1,2,6-hexanetriol;
$C_{1-4}$alkyl ethers of diols, preferably mono$C_{1-4}$alkyl ethers of $C_{2-12}$diols: {for example 2-methoxyethanol, 2-(2-methoxyethoxy)ethanol, 2-(2-ethoxyethoxy)-ethanol, 2-[2-(2-methoxyethoxy)ethoxy] -ethanol, 2-[2-(2-ethoxyethoxy)-ethoxy]-ethanol and/or ethyleneglycol monoallyl ether};
cyclic amides, preferably 2-pyrrolidone, N-methyl-2-pyrrolidone, N-ethyl-2-pyrrolidone, caprolactam and/or 1,3-dimethylimidazolidone;
cyclic esters, preferably caprolactone;
sulphoxides, preferably dimethyl sulphoxide and/or sulpholane; and/or any suitable mixtures thereof.

More preferred water-soluble organic solvents are selected from:
cyclic amides (e.g. 2-pyrrolidone, N-methyl-pyrrolidone and N-ethyl-pyrrolidone); diols, (e.g. 1,5-pentane diol, ethyleneglycol, thiodiglycol, diethyleneglycol and triethyleneglycol);
$C_{1-4}$alkyl ethers of diols (e.g. 2-methoxy-2-ethoxy-2-ethoxyethanol); and any suitable mixtures thereof.

A preferred liquid medium comprises:
(a) from 75 to 95 parts water; and
(b) from 25 to 5 parts in total of one or more solvents selected from:
diethylene glycol, 2-pyrrolidone, thiodiglycol, N-methylpyrrolidone, cyclohexanol, caprolactone, caprolactam and pentane-1,5-diol;
where the parts are by weight and the sum of the parts (a)+(b)=100.

Another preferred liquid medium comprises:
(a) from 60 to 80 parts water;
(b) from 2 to 20 parts diethylene glycol; and
(c) from 0.5 to 20 parts in total of one or more solvents selected from:
2-pyrrolidone, N-methylpyrrolidone, cyclohexanol, caprolactone, caprolactam, pentane-1,5-diol and thiodiglycol;
where the parts are by weight and the sum of the parts (a)+(b)+(c)=100.

Examples of further suitable media for inks of the present invention comprise a mixture of water and one or more organic solvents are described in U.S. Pat. No. 4,963,189, U.S. Pat. No. 4,703,113, U.S. Pat. No. 4,626,284 and EP 0425150-A.

When the liquid medium comprises an organic solvent free from water, (i.e. less than 1% water by weight) the solvent preferably has a boiling point of from 300 to 200° C., more preferably of from 400 to 150° C., especially from 50 to 125° C. The organic solvent may be water-immiscible, water-miscible or a mixture of such solvents. Preferred water-miscible organic solvents comprise any of those described above and mixtures thereof. Preferred water-immiscible solvents comprise aliphatic hydrocarbons; esters (for example ethyl acetate) chlorinated hydrocarbons (for example dichloromethane), ethers (for example diethyl ether) and mixtures thereof.

When the liquid medium comprises a water-immiscible organic solvent, preferably it comprises a polar solvent (for example a $C_1$alkanol) to enhance the solubility of the dye in the liquid medium. It is especially preferred that where the liquid medium is an organic solvent free from water it comprises a ketone (especially methyl ethyl ketone) and/or an alcohol (especially a $C_{1-4}$alkanol, more especially ethanol or propanol).

The organic solvent free from water may be a single organic solvent or a mixture of two or more organic solvents. It is preferred that when the medium is an organic solvent free from water it is a mixture of 2 to 5 different organic solvents. This allows a medium to be selected which gives good control over the drying characteristics and storage stability of the ink.

Ink media comprising an organic solvent free from water are particularly useful where fast drying times are required and particularly when printing onto hydrophobic and non-absorbent substrates, for example plastics, metal and glass.

Preferred low melting solid media have a melting point in the range from 60°C. to 125° C. Suitable low melting point solids include long chain fatty acids or alcohols, preferably those with $C_{18-24}$chains, and sulphonamides. The dye of Formula (1) may be dissolved in the low melting point solid or may be finely dispersed in it.

The ink may also contain additional components conventionally used in inks for IJP, for example viscosity and surface tension modifiers, corrosion inhibitors, biocides, kogation reducing additives and surfactants which may be ionic or non-ionic.

A further aspect of the invention provides a process for printing an image on a substrate comprising applying an ink comprising a dye of Formula (1) to the substrate by means of an ink jet printer. The ink used in this process is preferably an ink of the present invention as defined herein.

The ink jet printer preferably applies the ink to the substrate in the form of droplets which are ejected through a small orifice onto the substrate. Preferred ink jet printers are piezoelectric ink jet printers and thermal ink jet printers. In thermal ink jet printers, programmed pulses of heat are applied to the ink in a reservoir by means of a resistor adjacent to the orifice, thereby causing the ink to be ejected in the form of small droplets directed towards the substrate during relative movement between the substrate and the orifice. In piezoelectric ink jet printers the oscillation of a small crystal causes ejection of the ink from the orifice.

The substrate is preferably paper, plastic, a textile, metal or glass, more preferably paper, an overhead projector slide or a textile material, especially paper. Preferred papers are plain or treated papers which may have an acid, alkaline or neutral character.

A further aspect of the present invention provides a paper, an overhead projector slide or a textile material printed with an ink and/or a dye as defined herein and/or by means of a process as defined herein.

When the substrate is a textile material the ink according to the invention is preferably applied thereto by:

i) applying the ink to the textile material using an ink jet printer; and ii) heating the printed textile material at a temperature of from 50° C. to 250° C.

Preferred textile materials are natural, synthetic and semi-synthetic materials. Examples of preferred natural textile materials include wool, silk, hair and cellulosic materials, particularly cotton, jute, hemp, flax and linen. Examples of preferred synthetic and semi-synthetic materials include polyamides, polyesters, polyacrylonitriles and polyurethanes.

Preferably the textile material has been treated with an aqueous pretreatment composition comprising a thickening agent and optionally a water-soluble base and a hydrotropic agent and dried prior to step i) above.

The pre-treatment composition preferably comprises a solution of the base and the hydrotropic agent in water containing the thickening agent. Particularly preferred pre-treatment compositions are described more fully in EP 0534660-A.

The invention is further illustrated by the following Examples in which all parts and percentages are by weight unless otherwise stated.

EXAMPLE 1

Preparation of

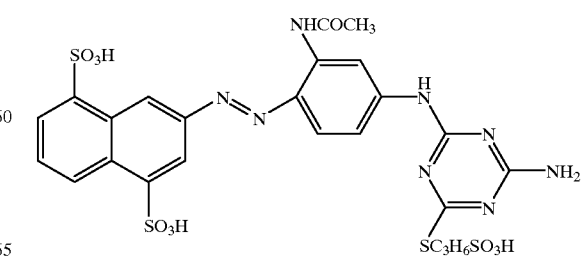

i) Preparation of

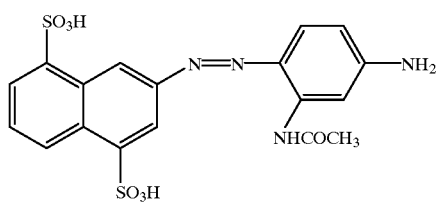

2-Aminonapthalene4,8-disulphonic acid (64.0 g) was stirred in water (400 cm³) at pH 7, cooled to 0–10° C. and concentrated hydrochloric acid (100 cm³) was added followed by sodium nitrite solution (100 cm³ of 2 mol.dm⁻³) at 0–10° C. The reaction mixture was stirred for 1 hour before the excess nitrite was reacted with sulphamic acid.

A solution of m-aminoacetanilide in water (400 cm³) at pH 7 was added to the diazo solution and buffer to pH 4 with sodium acetate. The reaction mixture was stirred for 16 hours and allowed to warm to 20° C. before recovering the solid by filtration. The filtered salt was washed with saturated brine (500 cm³) and dried at 60° C. in an oven to give 101.2 g of product.

ii) The product (11.6 g) from i) above was stirred in water (300 cm³) and the pH adjusted to 8 with sodium hydroxide solution. Cyanuric chloride (4.6 g) in acetone (50 cm³) was added to the monoazo solution at 0–10° C. maintaining the pH at 5–6 by addition of sodium hydroxide solution (2 mol.dm⁻³). The reaction mixture was stirred for 2 hours. 3-Mercapto-1-propanesulphonic acid (13.5 g) in water (100cm³) was added and the reaction warmed to 55–60° C. and maintaining the pH at 8–9 with sodium hydroxide solution whilst stirring for 6 hours. The reaction mixture was cooled to 20° C. the pH adjusted to 7 with hydrochloric acid and acetone added to precipitate a solid. The solid was collected by filtration washed with acetone and dried at 60° C. overnight to give the title compound (14.9 g).

EXAMPLE 2

Preparation of

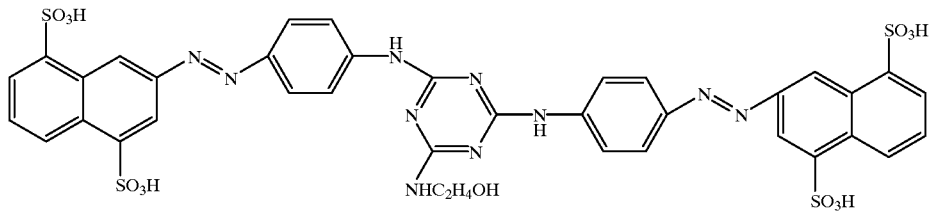

i) Preparation of

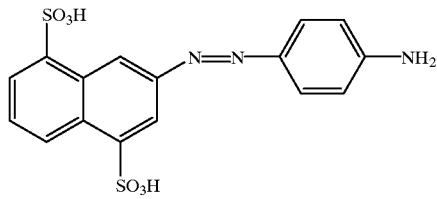

the procedure of Example 1 i) was used except that aniline was used in place of the m-aminoacetanilide to give 48 g of product.

ii) The product (12 g) from i) above was dissolved in water and cyanuric chloride (4 g) in acetone (25 cm³) was added dropwise at 0–5° C. The mixture was stirred at 0–5° C. for 30 minutes before adding a further 12 g of product from i) above. The mixture was stirred at 20° C. and pH 6–7 for 4 hours. Ethanolamine (3.7 g) was added and the pH adjusted to 9 with sodium carbonate before stirring for 16 hours at 70° C. Sodium chloride solution (10% w/v) was added and the solid precipitated was collected by filtration and then dried at 75° C. overnight to give the title compound (14.2 g).

EXAMPLE 3

Preparation of

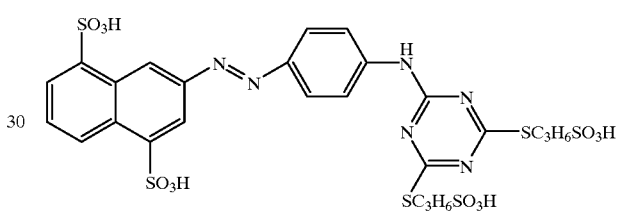

Prepared in an analogous fashion to Example 1 but using the monoazo compound from Example 2 together with excess $HSC_3H_6SO_3H$.

EXAMPLE 4

Preparation of

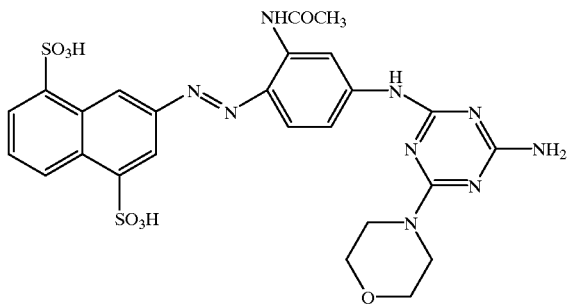

Prepared as Example 1 replacing HSC$_3$H$_6$SO$_3$H by morpholine.

EXAMPLE 5

Preparation of

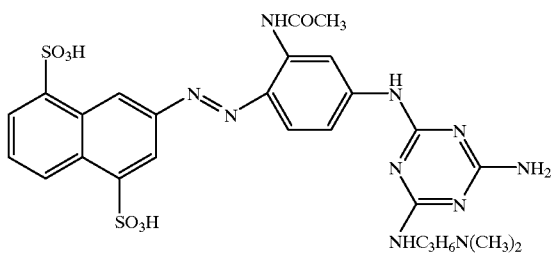

Prepared as Example 1 replacing HSC$_3$H$_6$SO$_3$H by N,N-dimethylpropane-1,3-diamine.

EXAMPLE 6

Preparation of

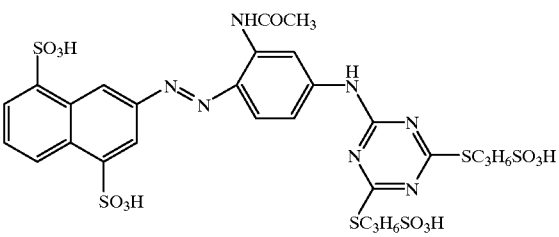

Prepared by reaction of dichlorotriazine of Example 1 with excess HSC$_3$H$_6$SO$_3$H.

EXAMPLE 7

Preparation of i)

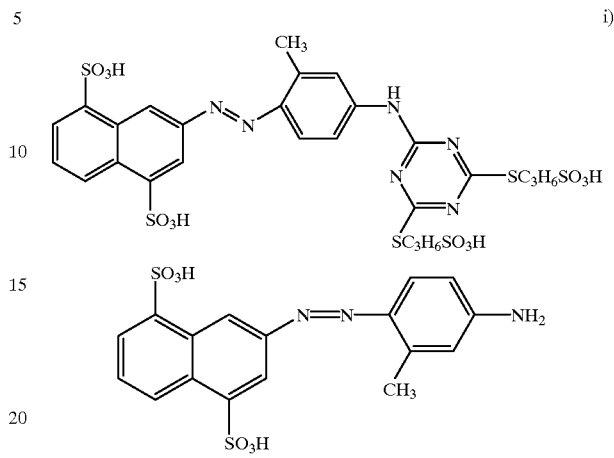

prepared by the method of Example 1 i) except that 3-methylaniline was used in place of the m-aminoacetanilide.

ii) The title compound was prepared from the above monoazo compound using the method of Example 3.

EXAMPLE 8

Preparation of

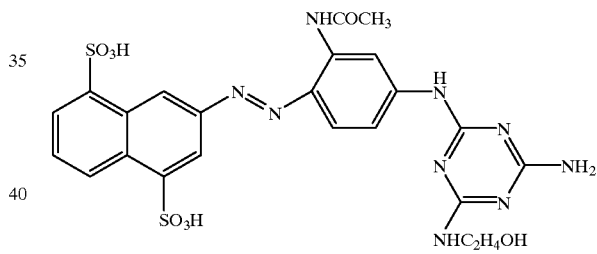

Prepared as for Example 1 replacing HSC$_3$H$_6$SO$_3$H by ethanolamine.

EXAMPLE 9

Preparation of

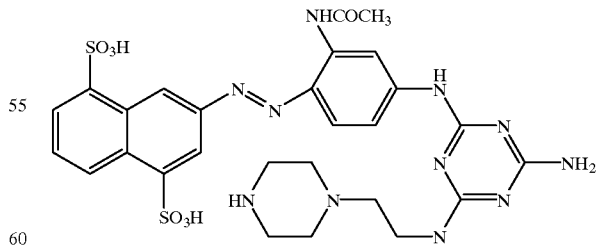

Prepared as Example 1 replacing HSC$_3$H$_6$SO$_3$H by 1-(2-aminoethyl)piperazine.

Salts

The exemplified compounds 1 to 8, prepared as described above, were converted to their purified sodium salts as follows. Each example was stirred in water (400 cm$^3$) to form a slurry the pH of which was adjusted to 9. The solution was dialysed until its conductivity was measured to be less than 100 $\mu$Scm$^{-1}$. The solution was then filtered through Whatman GF/C and 0.45 $\mu$m filter papers (Example 2 used 1.6, 0.8, 0.45 and 0.2 $\mu$m filter papers) to obtain a purified sodium salt suitable for use directly in an ink as described below.

Inks

The effectiveness in ink jet printing of compounds of Formula (1) was demonstrated as follows. Inks separately comprising each exemplified dye were prepared by dissolving 2 parts of the sodium salt, prepared as described above, in 98 parts of a mixture of water and 2-pyrrolidone (in a respective ratio of 90:10 by volume). The inks were printed onto plain paper using a thermal ink-jet printer to give a bright yellow print which had good optical density and light fastness.]

Further inks comprising the exemplified dyes may be may be prepared as described in the following tables in which the number in the first column (headed Ex. no.) denotes the example number of dye to be used in the ink. The dye may be in its free acid form and/or in the form of any suitable salt (e.g. sodium salt). Numbers quoted in the second column onwards refer to the number of parts of the relevant ingredient and all parts are by weight. The inks may be applied to paper by thermal or piezo ink jet printing.

The following abbreviations are used in the tables:

PG=propylene glycol; DEG=diethylene glycol; NMP=N-methyl pyrollidone;

DMK=dimethylketone; NaST=Na stearate IPA=isopropanol;

MEOH=methanol; 2P=pyrollidone; MIBK=methylisobutyl keton;

CET=cetyl ammoniun bromide; TBT=teriary butanol; TKG=thiodiglycol;

BDL=butane-2,3-diol; PHO=Na$_2$HPO$_4$; and P12=propane-1,2-diol.

TABLE I

| Ex. no. | Dye | Water | PG | DEG | NMP | DMK | NaOH | Na ST | IPA | MEOH | 2P | MIBK |
|---|---|---|---|---|---|---|---|---|---|---|---|---|
| 1 | 2.0 | 80 | 5 | | | 6 | 4 | | | | 5 | |
| 2 | 3.0 | 90 | | 5 | 5 | | 0.2 | | | | | |
| 3 | 10.0 | 85 | 3 | | 3 | 3 | | | | 5 | 1 | |
| 4 | 2.1 | 91 | | 8 | | | | | | | | 1 |
| 5 | 3.1 | 86 | 5 | | | | | 0.2 | 4 | | | 5 |
| 6 | 1.1 | 81 | | | 9 | | 0.5 | 0.5 | | | 9 | |
| 7 | 2.5 | 60 | 4 | 15 | 3 | 3 | | | 6 | 10 | 5 | 4 |
| 8 | 5 | 65 | 5 | 20 | | | | | 10 | | | |
| 9 | 2.4 | 75 | 3 | 4 | | 5 | | | | 6 | | 5 |
| 1 | 4.1 | 80 | | 5 | 2 | 10 | | 0.3 | | | | |
| 2 | 3.2 | 65 | | 5 | 4 | 6 | | | 5 | 4 | 6 | 5 |
| 3 | 5.1 | 96 | | | | | | | | 4 | | |
| 4 | 10.8 | 90 | 5 | | | | | | 5 | | | |
| 5 | 10.0 | 80 | 2 | 6 | 2 | 5 | | | 1 | | 4 | |
| 6 | 1.8 | 80 | | 5 | | | | | | | 15 | |
| 7 | 2.6 | 84 | | | 11 | | | | | | 5 | |
| 8 | 3.3 | 80 | 2 | | | 10 | | | 2 | | 6 | |
| 9 | 12.0 | 90 | | | | 7 | 0.3 | | 3 | | | |
| 1 | 5.4 | 69 | 2 | 20 | 2 | 1 | | | | | 3 | 3 |

TABLE II

| Ex. no. | Dye | Water | PG | DEG | NMP | CET | TBT | TDG | BDL | PHO | 2P | P12 |
|---|---|---|---|---|---|---|---|---|---|---|---|---|
| 2 | 3.0 | 80 | 15 | | | 0.2 | | | | | 5 | |
| 3 | 9.0 | 90 | | 5 | | | | | | 1.2 | | 5 |
| 4 | 1.5 | 85 | 5 | 5 | | 0.15 | 5.0 | 0.2 | | | | |
| 5 | 2.5 | 90 | | 6 | 4 | | | | | 0.12 | | |
| 6 | 3.1 | 82 | 4 | 8 | | 0.3 | | | | | | 6 |
| 7 | 0.9 | 85 | | 10 | | | | | 5 | 0.2 | | |
| 8 | 9.0 | 90 | | 5 | 5 | | 0.3 | | | | | |
| 9 | 4.0 | 70 | | 10 | 4 | | | | 1 | | 4 | 11 |
| 1 | 2.2 | 75 | 4 | 10 | 3 | | | | 2 | | 6 | |
| 2 | 10.0 | 91 | | | 6 | | | | | | | 3 |
| 3 | 9.0 | 76 | | 9 | 7 | | 3.0 | | | 0.95 | 5 | |
| 4 | 5.0 | 78 | 5 | 11 | | | | | | | 6 | |
| 5 | 5.4 | 86 | 5 | | 7 | | | | | | 7 | |
| 6 | 2.1 | 70 | 5 | 5 | 5 | 0.1 | 0.2 | 0.1 | 5 | 0.1 | 5 | |
| 7 | 2.0 | 90 | | | 10 | | | | | | | |
| 8 | 2.0 | 88 | | | | | | 10 | | | | |
| 9 | 5.0 | 78 | | | 5 | | | 12 | | | 5 | |
| 1 | 8.0 | 70 | 2 | | 8 | | | 15 | | | 5 | |
| 2 | 10.0 | 80 | | | | | | 8 | | | 12 | |

What is claimed is:
1. At least one compound of Formula (1):

Formula(1)

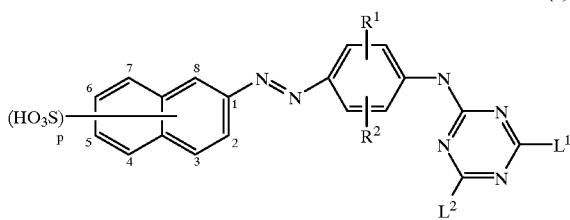

which comprises any suitable form of the compound where:
p represents from 1 to 7 inclusive;
the naphthyl moiety may be optionally substituted;
$R^1$ is H or at least one of the following substituents, optionally substituted:
$C_{1-4}$-alkyl, $NHCOC_{1-4}$alkyl, NHCOaryl, $NHSO_2C_{1-4}$-alkyl, $NHSO_2$aryl, $NHCONR^3R^4$ where $R^3$ and $R^4$ each independently is H, $C_{1-4}$alkyl or aryl;
$R^2$ is H, or $C_{1-4}$ alkyl;
$L^1$ is at least one of the following substituents, optionally substituted:
—$SC_{1-4}$alkylene$SO_3H$, —$NHC_{1-4}$alkylene$SO_3H$,
—$NHC_{1-4}$alkylene$(CO_2H)_n$ where n is 1, 2 or 3,
—$SC_{1-4}$alkylene$(CO_2H)_m$ where m is 1, 2 or 3,
a moiety of Formula (2)

Formula (2)

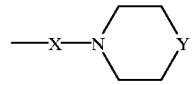

where:
X represents $NHC_{1-4}$alkylene and Y is NH;
$L^2$ is one of the following substituents optionally substituted;
a moiety of Formula (3) or of the Formula:

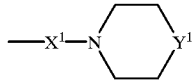

or of formula 3:

Formula (3)

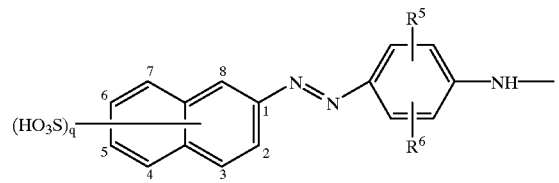

where:
$X^1$ represents $NHC_{1-4}$alkylene or a direct link;
$Y^1$ is O or NH;
q represents from 1 to 7 inclusive;
the naphthyl moiety may be optionally substituted; and
$R^5$ and $R^6$ each independently is H or at least one of the following substituents, optionally substituted: $C_{1-4}$-alkyl, $NHCOC_{1-4}$ alkyl, $C_{1-4}$-alkoxy, NHCOaryl, $NHSO_2C_{1-4}$ alkyl, $NHSO_2$aryl and $NHCONR^7R^8$ where $R^7$ and $R^8$ each independently is H, $C_{1-4}$alkyl or aryl;
where the optional substituents herein comprise: $C_{1-4}$alkyl, $C_{1-4}$haloalkyl, $C_{1-4}$alkoxy, $C_{1-4}$haloalkoxy, carboxy, sulpho, hydroxy, amino, mercapto, cyano, nitro and halo;
with the proviso that when p is 2 and the two —$SO_3H$ groups in the naphthyl moiety are in the 3 and 7 positions, and if $L^2$ is of Formula (3), q is 2 and the two —$SO_3H$ groups in the naphthyl moiety are in the 3 and 7 positions and with the proviso that if $L^1$ is an $NHC_{1-4}$ alkylene $SO_3H$ group, $R^1$ is an $NHSO_2C_{1-4}$alkyl, $NHSO_2$aryl or $NHCONR^3R^4$ group.

2. A compound according to claim 1 wherein $L^2$ is of the Formula (3) as defined in claim 1.

3. A compound according to either claim 1 or claim 2 wherein $L^1$ is —$SC_{1-4}$alkylene, —$NHC_{1-4}$alkylene$(CO_2H)_n$, —$SC_{1-4}$alkylene$(CO_2H)_m$ or a moiety of Formula (2).

4. A compound according to claim 1 wherein:
$R^1$ and $R^6$ are both $NHCOCH_3$;
$R^3$, $R^4$, $R^7$ and $R^8$ are all H; and
n and m is each independently 1 or 2.

5. A compound according to claim 1 or 2 wherein p is 2, $L^2$ is a moiety of the Formula (3), q is 2, and the two sulpho groups on each naphthyl group are in the 3 and 7 positions.

6. A compound according to claim 1 or 2 wherein the compound is in the form of a lithium, sodium, ammonium or substituted ammonium salt.

7. An ink comprising at least one compound of Formula (1) as claimed in claim 1, with the exception that Y can be O or NH, and a suitable medium.

8. An ink according to claim 7 comprising:
(a) from 0.01 to 30 parts of the compound of Formula (1); and
(b) from 70 to 99.99 parts of the medium;
wherein the parts are by weight and the number of parts of (a)+(b)=100.

9. An ink comprising a medium and a compound of Formula (1) as defined in claim 1.

10. A process for printing a substrate with an ink by ink jet printing wherein the ink is an ink as claimed in claim 7, 8 or 9.

11. A substrate printed with an ink as claimed in claims 7, 8 or 9, the substrate selected from one or more of: paper, an overhead projector slide and a textile material.

12. A process for the colouring a textile material with an ink as claimed in claims 7, 8 or 9, the process comprising the steps of:
i) applying the ink to the textile material by ink-jet printing; and
ii) heating the textile material at a temperature from 50° C. to 250° C. to fix the dye on the material.

13. A textile material coloured with an ink as claimed in claims 7, 8 or 9.

14. A process for preparing at least one compound of Formula (1) as claimed in claim 1 the process comprising condensing a compound of Formula (6):

Formula (6)

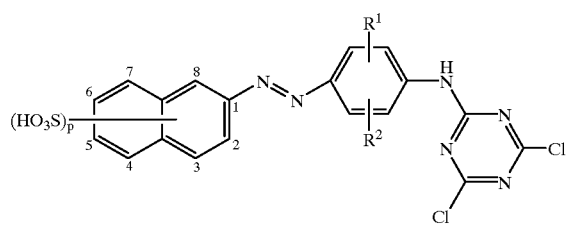

with compounds of formulae $L^1H$ and $L^2H$ in which p, $R^1$, $R^2$, $L^1$ and $L^2$ are as defined in claim 1.

* * * * *